(12) United States Patent
Diamond

(10) Patent No.: US 7,444,380 B1
(45) Date of Patent: Oct. 28, 2008

(54) METHOD AND SYSTEM FOR DISPENSING AND VERIFICATION OF PERMISSIONS FOR DELIVERY OF ELECTRONIC MESSAGES

(76) Inventor: Marc Diamond, 531 Main St., #303, New York, NY (US) 10044

( * ) Notice: Subject to any disclaimer, the term of this patent is extended or adjusted under 35 U.S.C. 154(b) by 915 days.

(21) Appl. No.: 10/890,732

(22) Filed: Jul. 13, 2004

(51) Int. Cl.
*G06F 15/16* (2006.01)
*G06F 15/173* (2006.01)

(52) U.S. Cl. .................. 709/206; 709/203; 709/219; 709/224; 709/238

(58) Field of Classification Search ................ 709/206, 709/207, 203, 219, 224, 238; 705/401
See application file for complete search history.

(56) References Cited

U.S. PATENT DOCUMENTS

| | | | |
|---|---|---|---|
| 6,085,321 A | 7/2000 | Gibbs | |
| 6,266,692 B1 | 7/2001 | Greenstein | |
| 6,356,935 B1 | 3/2002 | Gibbs | |
| 6,393,465 B2 | 5/2002 | Leeds | |
| 6,405,319 B1 | 6/2002 | Arnold et al. | |
| 6,546,416 B1 | 4/2003 | Kirsch | |
| 6,553,358 B1 | 4/2003 | Horvitz | |
| 6,574,658 B1 | 6/2003 | Gabber et al. | |
| 6,615,348 B1 | 9/2003 | Gibbs | |
| 6,621,930 B1 | 9/2003 | Smadja | |
| 6,622,909 B1 | 9/2003 | Thomas et al. | |
| 6,760,752 B1 * | 7/2004 | Liu et al. ................... | 709/206 |
| 7,085,745 B2 * | 8/2006 | Klug .......................... | 705/401 |
| 2002/0023135 A1 | 2/2002 | Shuster | |
| 2002/0059385 A1 | 5/2002 | Lin | |
| 2002/0129111 A1 * | 9/2002 | Cooper ....................... | 709/207 |
| 2003/0009698 A1 | 1/2003 | Lindeman et al. | |
| 2003/0167311 A1 | 9/2003 | Kirsch | |
| 2003/0187942 A1 | 10/2003 | Quine et al. | |

OTHER PUBLICATIONS

D. Crocker Brandenburg, Vernon Schryver, John Levine, Anti-Spam Research Group, Internet Research Task Force, Internet Draft, "Technical Considerations for Spam Control Mechanisms" <http://asrg.kavi.com/apps/group_public/download.php/30/draft-crocker-spam-techconsider-02.txt>, Jun. 29, 2003, pp. 1 to 19.

Mark Delany, Internet Draft, Domain-based Email Authentication Using Public-Keys Advertised in the DNS (DomainKeys) <http://www.ietf.org/internet-drafts/draft-delany-domainkeys-base-00.txt>, May 2004, pp. 1 to 27.

(Continued)

*Primary Examiner*—Quang N. Nguyen
(74) *Attorney, Agent, or Firm*—Fernandez & Associates LLP

(57) ABSTRACT

System and method for delivery of an electronic message from a sender unknown to a recipient when such message comprises a sender code verified by recipient's electronic message handler, thereby eliminating delivery of unsolicited bulk messages. Dispensing sender codes per recipient addresses thwarts senders of unsolicited bulk messages. Dispensing sender codes upon successful response to a human response question further thwarts bulk senders. Sender code calculation according to periodically changing factors limits sender code utility to finite time periods.

35 Claims, 7 Drawing Sheets

OTHER PUBLICATIONS

J. Lyon, Microsoft Corporation; M. Wong, pobox.com; Internet Draft, "Sender ID Draft Specification: MTA Authentication Records in DNS" http://download.microsoft.com/download/d/a/2/da2821f5-6acb-4058-8974-5a3c7d187794/senderid.pdf>, Jun. 23, 2004, pp. 1 to 34.

Eric Dean, Yakov Shafranovich, Internet Draft, "Challenge/Response Interworking (CRI) Framework for Challenge/Response Email Systems" <http://www.faqs.org/ftp/internet-drafts/draft-irtf-asrg-cri-00.txt>, Sep. 22, 2003, pp. 1 to 6.

ePrivacy Group, "Trusted Email Open Standard"<http://www.eprivacygroup.net/teos/TEOSwhitepaper1.pdf>, May 2003, pp. 1 to 35.

David Levine, Taughannock Networks, "Technical approaches to spam" http://www.taugh.com/spamtech.pdf>, Nov. 2003, pp. 1 to 11.

Brightmail, Inc., "The Spam Problem and Brightmail's Solution" <www.brightmail.com/pdfs/Spam_problem_Whitepaper.pdf>, Jan. 2004, pp. 1 to 21.

Industry Canada, CIO Organization, "An Anti-Spam Action Plan for Canada," <http://e-com.ic.gc.ca/epic/internet/inecic-ceac.nsf/en/h_gv00246e.html>, May 2004, pp. 1 to 8.

Anti-Spam Technical Alliance (America Online, British Telecom, Comcast, Earthlink, Microsoft, and Yahoo?), "Technology and Policy Proposal" <http://docs.yahoo.com/docs/pr/pdf/asta_soi.pdf>, Jun. 22, 2004, pp. 1 to 19.

Sung-il Ahn, Organisation for Economic Co-operation and Development, "Background Paper for the OECD Workshop on Spam" <http://www.olis.oecd.org/olis/2003doc.nsf/LinkTo/dsti-iccp(2003)10-final>, Jan. 22, 2004, pp. 1 to 57.

\* cited by examiner

METHOD AND SYSTEM FOR DISPENSING AND VERIFICATION OF PERMISSIONS FOR DELIVERY OF ELECTRONIC MESSAGES

BACKGROUND

1. Field

Invention relates to data processing of electronic messages within a computer network, and in particular to a system for managing permissions for delivery of electronic messages.

2. Related Art

A substantial portion of electronic messages (such as email; instant messages; text messages to mobile telephones; or voice over Internet protocol, also known as VoIP) sent via the Internet is unsolicited and undesired by the recipient. The majority of these messages are sent in bulk, that is, a sender causes the transmission of messages to a large number of recipient addresses. The effort and cost to the sender of transmitting electronic messages in bulk is minimally additional to that of transmitting a single message. These messages may be referred to as Unsolicited Bulk Electronic messages, or UBE. The time spent by recipients of UBE deleting or sifting through such messages in order to access desired messages is unproductive and adds unnecessary cost to the use of electronic messaging and telephony.

One method for dealing with UBE comprises filtering the addresses from which messages identify themselves as being sent, deleting messages from addresses that are known to send UBE. U.S. Pat. No. 6,622,909 by Thomas, et al. and U.S. Pat. No. 6,393,465 by Leeds use differing approaches within this method. This method is continually defeated by the use of new sender addresses.

A second method comprises filtering the content of messages, deleting messages comprising content commonly associated with UBE. Since legitimate messages may contain content similar to that found in UBE, such filters limit themselves to purging only those messages that are unlikely to be legitimate in order to avoid deletion of legitimate messages. U.S. Pat. No. 6,553,358 by Horvitz and U.S. Pat. No. 6,621,930 by Smadja disclose filtering UBE with greater accuracy. This results in a method that somewhat reduces but does not eliminate delivery of UBE.

A third method provides a set of secondary addresses that are associated with a single primary email address. Messages sent to any secondary address are received by the primary address. When any of the secondary addresses receives a volume of UBE that the recipient considers excessive, the recipient discontinues use of that secondary address. Additional secondary addresses are added as required. U.S. application Ser. No. 20020023135 describes a form of this method. This method also reduces but does not stop delivery of UBE.

A fourth method (challenge-response) comprises replying to a message from an unknown sender with a request for a response. U.S. Pat. No. 6,546,416 by Kirsch describes this method, as do U.S. application Ser. No. 20030187942, U.S. application Ser. No. 20030167311, and U.S. application Ser. No. 20030009698. If a response is received and is acceptable, the original message is delivered. Although this method stops delivery of UBE, it has the following undesirable effects: First, for every message received from an unknown sender, an additional message must be sent by an email server over the Internet. Second, for a legitimate message to be sent to and received by a new recipient, three messages are required.

A fifth method, sender authentication, attempts to determine whether the sender address of a message is forged. Falsifying sender addresses and other header information is a method used by some senders of UBE to evade accountability. Implementation of sender authentication enables message handlers to discard messages that can be determined to have falsified headers. A sender authentication system can only authenticate messages from companies that participate in the system. Consequently, the proponent of each system seeks the system's mass adoption across the Internet. Sender authentication provides no solution for messages that originate from non-participating senders. Such messages cannot be denied delivery because they may be legitimate. Sender authentication schemes discourage but do not prevent delivery of commercial messages that are illegal for reasons other than falsification of headers, do not prevent delivery of unsolicited but legitimate advertising messages sent in bulk, and do not prevent delivery of messages sent to UBE mailing lists from computers participating in the authentication system that are manipulated by spam-sending viruses.

With sender authentication, including the method entitled "DomainKeys" that is sponsored by at least Yahoo!, Inc., the capability of generating the authenticating code that is later verified by an incoming message handler is maintained under the control of the sender or its agents, who can thus generate an unlimited number of authenticating codes for senders for their messages.

A sixth method comprises requiring permission or prior approval before allowing delivery of a message. In some of these methods, potential recipients may add a sender address to a list of trusted senders whose electronic messages will be delivered regardless of their inclusion of any permissions. Inventions that use this method are described next.

U.S. Pat. No. 6,356,935 by Gibbs describes a method wherein an electronic message will only be accepted if it contains an "adapted digital signature." The signature is based on the sender address and the recipient address and can be provided to the sender by the potential recipient. A later patent by the same inventor, U.S. Pat. No. 6,615,348, references this patent and references U.S. Pat. No. 6,085,321 by Gibbs, et al., both of which describe methods of generating the adapted digital signature. These inventions require that a sender, in order to obtain permission to send email, communicate with the potential recipient using some method other than email.

U.S. Pat. No. 6,574,658 by Gabber, et al. describes a method wherein an electronic message will only be accepted if it contains an "extended source address." One purpose of this method is to ensure that an initial message is sent from a valid email address. A sender may request an extended source address by (1) communicating with an intended recipient by a method other than email, (2) sending an initial electronic message to the potential recipient, or (3) registering at a web site. In each case an electronic message will be sent to the sender in an attempt to verify the address. Registration of the sender address at a web site requires the sending of an electronic message from the web site to the sender address requesting a reply from the sender that ensures that the sender address is valid. This invention further requires that extended source addresses be used for future communication between the sender and the recipient.

U.S. Pat. No. 6,405,319 by Arnold, et al. describes a method wherein an electronic message will only be accepted if it contains an "information access code." The code may only be obtained by communicating with the potential recipient using some method other than email.

U.S. Pat. No. 6,266,692 by Greenstein describes a method wherein a new field is added to the headers of electronic messages, the new header intended to contain a password. This invention requires a change in Internet email protocol to allow for the new field.

U.S. application Ser. No. 20020059385 by Lin describes a method wherein an electronic message will only be accepted if it contains a "trustcode" or if it is sent from one or more specific web sites. The sender may either (1) obtain a trustcode by communicating with the potential recipient using some method other than email, or (2) access a web site and supply a sender address, a recipient address and the body of a message, and request that the message be sent to the recipient. The sender may then receive a trustcode in an electronic message from the recipient.

Methods above that require permissions place a burden on email servers, the Internet, or individual senders by requiring one or more of the following actions:

Internet email protocol must be modified and all related software updated.

An email server must reply to every electronic message, which is not otherwise deleted or accepted, that is sent from an unknown sender.

A sender must communicate with an intended recipient using a method other than email prior to receiving permission to send an electronic message.

A sender must send an initial message to a potential recipient that will not be delivered, receive a second message containing some form of permission that will allow delivery of a future electronic message, and reply with a third electronic message containing the acquired permission.

A sender must access a web site that will verify the sender address by email communication with the sender address, whereupon the sender will receive permission for a future electronic message to be delivered to a recipient.

A sender must access a web site that will send a message to the recipient on behalf of the sender.

Accordingly, there is a need for a method that stops delivery of UBE, delivers legitimate electronic messages, does not require prior non-electronic communication between sender and recipient, does not require modification of electronic message headers, does not require delivery of any auxiliary electronic messages (such as for granting or verifying permissions), and imposes minimal effort on senders and receivers.

SUMMARY

A system for dispensing and verifying permissions for delivery of electronic messages, prohibiting delivery of unsolicited bulk electronic messages while not placing excessive burden on legitimate senders of electronic messages or on computers and devices that handle such messages.

A permission is included in an initial message from an unknown sender to a recipient. Permissions are obtained per recipient, thereby eliminating bulk electronic messages. Obtaining permission does not require prior communication, through email or otherwise, with an intended recipient. No software is required of the sender other than electronic communication software and World Wide Web-browsing software, both of which are common applications in use by computers connected to the Internet. No sender address verification is involved, no registration of a sender address is required, and no change in Internet protocols is required.

The present invention provides for the capability of generating and verifying permissions to be maintained in multiple locations instead of a single location. The capability is independently located at the recipient's message handler and at one or more other locations accessible to any computer communication via the Internet.

The capability of generating the authorizing code that is later verified by an incoming message handler is maintained under the control of the recipient or its agents and not maintained under the control of the sender or its agents, thus enabling the imposition of limits on the frequency with which authorizing codes are generated for senders for their messages.

A message handler need only send a single automated reply message to a specific sender address, and not one automated reply message for every undelivered message, when advising a sender that one or more messages were undelivered due to a lack of permission. The single automated message gives a sender the opportunity to obtain permissions for initial messages to any new recipient.

In one embodiment, a Sender Code Dispensing Calculator receives a recipient address and generates a Sender Code for an outgoing message according to a Seed associated with the recipient address. Such recipient address may be an IP (Internet Protocol) address, an email address, a partial email address which may be known as a "screen name," a telephone number or other electronic destination. Separately, a Sender Code Verification Calculator generates a Sender Code for an incoming message according to a Seed associated with the recipient address of the incoming message, and allows delivery of the message when a matching Sender Code is included in the incoming message.

In a further embodiment, a sender enters a recipient address into a World Wide Web form and receives a Sender Code for inclusion in an outgoing message to the recipient, the Sender Code according to the recipient address.

A further embodiment allows delivery of an incoming message when the incoming message originates from a sender address included in an Approved Sender List. Such sender address may be an IP address, an email address, a partial email address which may be known as a "screen name," a telephone number or other electronic destination.

A further embodiment discards an incoming message when the incoming message originates from a sender address included in a Denied Sender List.

Further embodiments of the invention generate a Sender Code additionally based on the sender address, and/or the current date and time.

A further embodiment changes the Seed periodically.

A further embodiment requests a sender response to a human response question prior to displaying to the sender a Sender Code on a World Wide Web page.

In another embodiment, an email composition software, instant message software, text message software, VoIP software or outgoing message handler receives a Sender Code from a Sender Code Dispensing Computer, and inserts the Sender Code into an outgoing electronic message.

In another embodiment, an email composition software, instant message software, text message software, VoIP software or outgoing message handler receives a Sender Code from a Sender Code Dispensing Computer when a human response question is correctly answered by a sender, and inserts the Sender Code into an outgoing electronic message.

DETAILED DESCRIPTION

Figure 1:
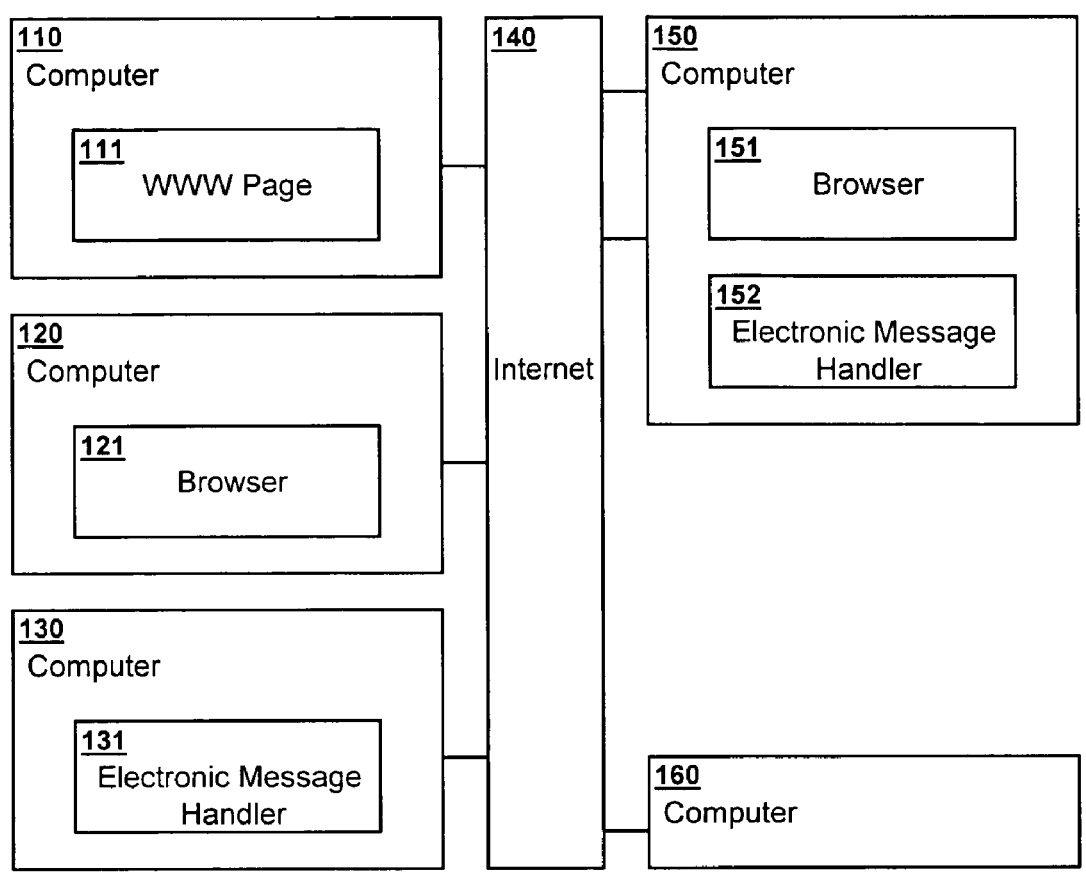
FIG. 1 is a block diagram illustrating a system for dispensing and verification of permissions for delivery of electronic messages, according to an embodiment of the present invention.

FIG. 1 is a block diagram illustrating a system for dispensing and verification of permissions for delivery of electronic messages, according to an embodiment of the present invention. Browser 121 comprises software for receiving, reading and displaying World Wide Web Pages 111. Electronic Message Handler 131 comprises software for receiving, managing and transmitting electronic messages for one or more electronic addresses via the Internet 140. In the embodiment shown in FIG. 1, World Wide Web Pages 111 reside on Computer 110, Browser 121 executes on Computer 120, and Electronic Message Handler 131 executes on Computer 130, and Computers 110, 120 and 130 communicate via the Internet 140. It will be obvious to one of ordinary skill in the art that World Wide Web Pages 111 can reside on any computer (or storage) communicating via the Internet 140, and that Browser 121 and Electronic Message Handler 131 may execute on any computing device communicating via the Internet 140, including but not limited to distributed computing devices and reconfigurable computing devices. Communication via the Internet may proceed over one or more of wires, optical channels, wireless channels, satellites and/or other communication pathways.

A plurality of computers or computer networks represented by Computer 150 communicate via the Internet 140, have various functions, and include browsers, represented by Browser 151, and electronic message handlers, represented by Electronic Message Handler 152, which receives, manages, and transmits electronic messages for one or more electronic addresses via the Internet 140.

Figure 2:
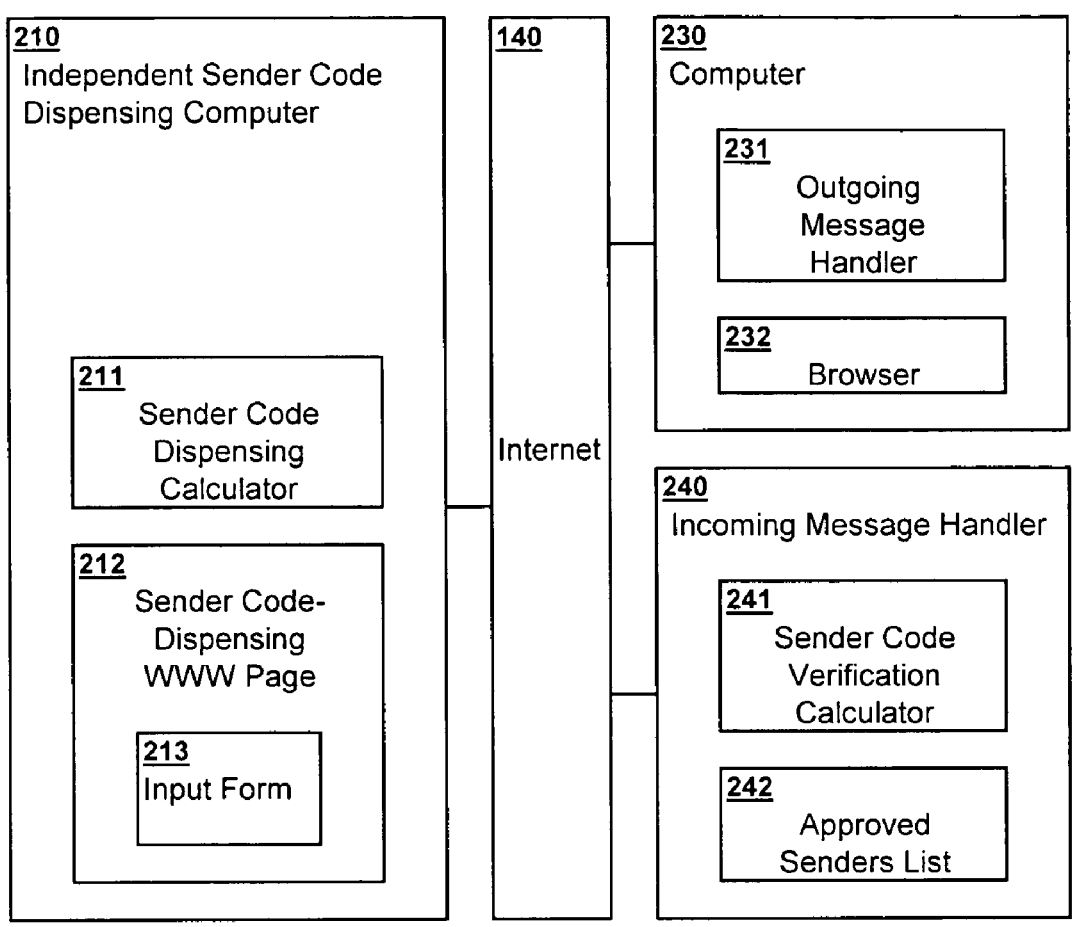
FIG. 2 is a block diagram illustrating a system for dispensing and verification of permissions for delivery of electronic messages, according to an embodiment of the present invention.

FIG. 2 is a block diagram illustrating a system for dispensing and verification of permissions for delivery of electronic messages, according to an embodiment of the present invention. The functions and relationship of Computers 110, 120, 130, 150 and 160 and the Internet 140 of FIG. 1 are collectively representative of an Independent Sender Code Dispensing Computer 210, a Computer 230, an Incoming Message Handler 240 and the Internet 140 of FIG. 2.

An Independent Sender Code Dispensing Computer 210 communicates via the Internet 140 and comprises a Sender Code Dispensing Calculator 211 and a Sender Code Dispensing World Wide Web Page 212, wherein the Sender Code Dispensing World Wide Web Page 212 comprises an Input Form 213.

A potential sender of an electronic message communicates via the Internet 140 using a Computer 230 that comprises an Outgoing Message Handler 231 and a World Wide Web Browser 232. The Sender Code Dispensing World Wide Web Page 212 is displayed in the sender's Browser 232. The sender inputs the electronic address of an intended recipient into the Input Form 213, and the content of the input form is submitted to the Independent Sender Code Dispensing Computer 210. The Sender Code Dispensing Calculator 211 uses a Calculation Algorithm, not shown, to calculate a Sender Code based on a Seed associated with the recipient address submitted via Input Form 213. The Calculation Algorithm comprises a set of mathematical operations for manipulating the Seed and generating a text string hereinafter also referred to as a Sender Code. An example Calculation Algorithm is described at the end of this specification. The Sender Code is displayed on the Sender Code Dispensing World Wide Web Page 212, which is displayed in the sender's Browser 232. The sender copies the Sender Code into an electronic message and transmits the message to the recipient.

In an optional embodiment, the Independent Sender Code Dispensing Computer 210 logs the sender address and/or the IP address of the computer accessing a Sender Code Dispensing World Wide Web Page 212. In another optional embodiment, the Independent Sender Code Dispensing Computer 210 limits the number of Sender Codes dispensed to a sender address, and/or separately limits the number of Sender Codes dispensed to an IP address, in order to defeat a sender of UBE wherein the sender uses different fake sender addresses for separate messages. In another optional embodiment, a cost is incurred by the sender for the dispensing of a Sender Code. In another optional embodiment, a time delay precedes the dispensing of a Sender Code, in order to limit the number of Sender Codes dispensed to a sender address and/or dispensed to an IP address. Optionally, information transferred to the Sender Code Dispensing Computer by a sender's browser may be retained as well, such as operating system and/or software versions.

An Incoming Message Handler 240 communicates via the Internet 140 and comprises a Sender Code Verification Calculator 241 and an Approved Senders List 242. Incoming Message Handler 240 receives an electronic message comprising a sender address and a recipient address. If the sender address is included in the Approved Sender List 242, Incoming Message Handler 240 allows the electronic message to be delivered to the recipient. Otherwise the Sender Code Verification Calculator 241 calculates a Sender Code based on a Seed associated with the recipient address and according to a Calculation Algorithm. If the electronic message comprises the Sender Code (as calculated by the Sender Code Verification Calculator 241), Incoming Message Handler 240 allows delivery of the electronic message to the recipient. The Calculation Algorithm used by the Sender Code Verification Calculator 241 is the same as the Calculation Algorithm used by the Sender Code Dispensing Calculator 211.

In an optional embodiment, the Sender Code generated by the Sender Code Dispensing Calculator 211 is not based on a Seed, but instead comprises a digitally signed piece of data (however note that the digital signature may be based on a seed.). Examples include a digitally signed checksum of the electronic message, a digitally signed hash-value of the electronic message, any digitally signed data extracted from the electronic message, or any other piece of digitally signed data. The Sender Code Verification Calculator 241, upon reception of the electronic message, proceeds to (a) compute the (unsigned) piece of data ("duplicate data"), (b) verify that the digital signature is valid, and (c) verify that the digitally signed piece of data matches the "duplicate data" computed by the Sender Code Verification Calculator 241. If the verifications succeed, Incoming Message Handler 240 allows delivery of the electronic message to the recipient, otherwise delivery is not allowed. It is an advantageous aspect of this optional embodiment that even if the Sender Code Verification Calculator 241 is compromised and/or otherwise controlled by a party intent on generating Sender Codes for sending electronic message instead of for verification of incoming electronic messages, it cannot be used to generate valid Sender Codes which comprise digitally signed data. This is so because generating such a digital signature requires possession of the corresponding private key which is kept secret by the Sender Code Dispensing Calculator 211, and the Sender Code Verification Calculator 241 has only knowledge of the corresponding public key. The implementation of this optional embodiment (or similar public-key based cryptographic embodiments) may use any public-key cryptographic system or set of protocols, such as the Rivest-Shamir-Adleman (RSA) algorithm, or similar algorithms as should be obvious to one of ordinary skill in the art. A variation on this embodiment uses a cryptographic secret-sharing protocol in order for the Sender Code Dispensing Calculator 211 and the Sender Code Verification Calculator 241 to agree on a secret Seed and use this Seed as in previous Seed-based embodiments. The two Calculators 211 and 241 may easily and periodically change their shared secret Seed over public and insecure networks using such a secret-sharing cryptographic protocol.

Note that in the embodiments where the Sender Code Verification Calculator 241 does use a Seed, the Seed is preferably applicable only to the recipient addresses served by the Sender Code Verification Calculator 241. This guards against a hijacking and/or other malicious control of the Sender Code Verification Calculator 241 for sending messages to other recipient addresses which are not served by the Sender Code Verification Calculator 241 (and hence are subject to verification based on different Seeds).

Figure 3:
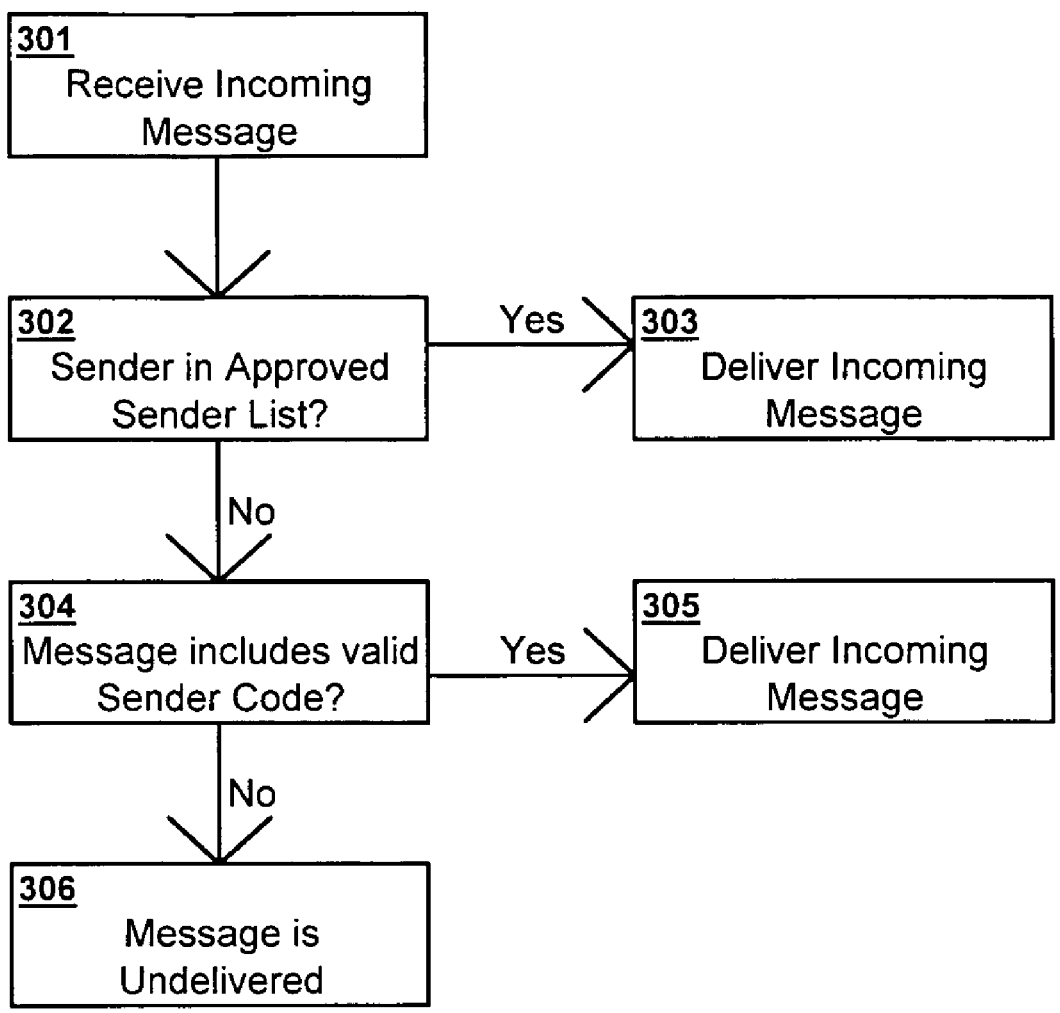
FIG. 3 is a flow diagram illustrating a method for verification of permissions for delivery of electronic messages, according to an embodiment of the present invention.

FIG. 3 is a flow diagram illustrating a method for verification of permissions for delivery of electronic messages, according to an embodiment of the present invention. Incoming Message Handler 240 receives 301 an incoming electronic message and determines 302 whether the sender address indicated in the electronic message is included in the Approved Senders List 242. If the sender address is included, the Incoming Message Handler 240 allows 303 delivery of the electronic message to the recipient. If the sender address is not included, the Incoming Message Handler 240 determines 304 whether the electronic message comprises the Sender Code calculated for this message by the Sender Code Verification Calculator 241. If the message comprises the Sender Code, Incoming Message Handler 240 allows 305 delivery of the electronic message to the recipient. If the message does not comprise the Sender Code, Incoming Message Handler 240 does not allow 306 delivery of the electronic message, for example by discarding the electronic message and/or by submitting the electronic message for inspection or logging.

Optionally, all but one of a set of incoming messages are held for later delivery to the recipient when such messages have valid Sender Codes and the same sender address, until one of the messages has been delivered to the recipient and until the sender address has been added to an Approved Senders List 242.

Optionally, when an outgoing message handler 231 sends a message to an address, wherein the address is not included in an Approved Senders List 242 or a Denied Senders List 444 (described below), the Outgoing Message Handler 231 adds that address to an Approved Senders List 242.

Optionally, when an Incoming Message Handler 240 receives a message, wherein the message does not comprise a valid Sender Code or a sender address included in an Approved Senders List 242, the Incoming Message Handler 240 reviews header information in the message to determine if the present message is a reply to a second previously sent message, the second message originating from the recipient of the present message. If the present message is in fact a reply, the present message is delivered and the sender address may be added to an Approved Senders List 242. In a related optional embodiment, an Outgoing Message Handler for the recipient (not shown) adds to the header of an outgoing message an identifying text string that will assist the Incoming Message Handler 240 in recognizing incoming replies to such sent messages.

In an optional embodiment, a recipient maintains a list of Mailing Lists and Forwarded Addresses (not shown), wherein, when such an address is included in the "To" field of an electronic message, a copy of the message is sent to the recipient address by the electronic message handler that receives messages for the mailing list address or the forwarded address named in the "To" field. The recipient may opt to receive such messages without verifying whether a Sender Code is included, in which case the Incoming Message Handler 240 will determine whether the sender address indicated in the electronic message is included in the list of Mailing Lists and Forwarded Addresses. If the sender address is in fact included in the list of Mailing Lists and Forwarded Addresses, the Incoming Message Handler 240 allows delivery of the electronic message to the recipient. Alternatively, the recipient may opt to require Sender Codes in such messages, in which case the Sender Code Verification Calculator 241 calculates a Sender Code based on a Seed associated with the "To" address (rather than associated with the recipient address) and according to the Calculation Algorithm. If the electronic message comprises the Sender Code (as calculated by the Sender Code Verification Calculator 241), the Incoming Message Handler 240 allows delivery of the electronic message to the recipient.

Figure 4:
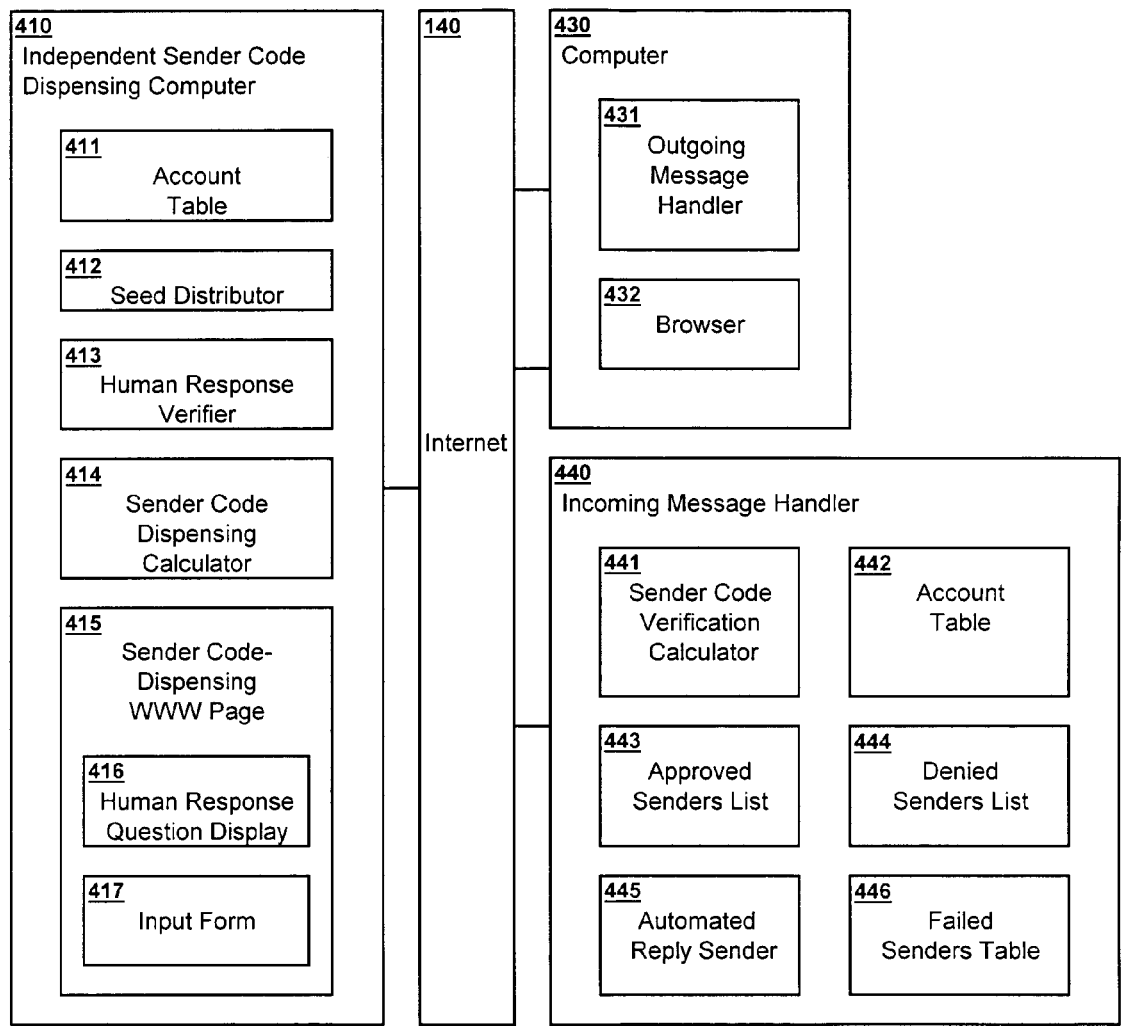
FIG. 4 is a block diagram illustrating a system for dispensing and verification of permissions for delivery of electronic messages using a human response question, according to an embodiment of the present invention.

FIG. 4 is a block diagram illustrating a system for dispensing and verification of permissions for delivery of electronic messages using a human response question, according to an embodiment of the present invention. An Independent Sender Code Dispensing Computer 410 communicates via the Internet 140 and comprises an Account Table 411, a Seed Distributor 412, a Human Response Verifier 413, a Sender Code Dispensing Calculator 414 and a Sender Code Dispensing World Wide Web Page 415. The Account Table 411 maintains a list of recipient addresses coupled with numeric Seeds. The Sender Code Dispensing World Wide Web Page 415 comprises a Human Response Question Display 416 and an Input Form 417.

A potential sender of an electronic message communicates via the Internet 140 using a Computer 430 comprising an Outgoing Message Handler 431 and a World Wide Web Browser 432. The Sender Code Dispensing World Wide Web Page 415 is displayed in the sender's Browser 432. The sender inputs the electronic address of an intended recipient, the sender address, and the response to the question displayed in the Human Response Question Display 416 into the Input Form 417, which is submitted to the Independent Sender Code Dispensing Computer 410.

If the Independent Sender Code Dispensing Computer 410 determines that the response to the human response question is correct, the Sender Code Dispensing Calculator 414 uses a Calculation Algorithm, not shown, to calculate a Sender Code based on (1) the current date and time, (2) the Seed associated with the recipient address maintained in Account Table 411, (3) the sender address that was submitted via the Input Form 417, and (4) the recipient address that was submitted via Input Form 417.

The Calculation Algorithm comprises a set of mathematical operations for manipulating the characters of the sender address, the characters of the recipient address, the current date and time, and the Seed to generate a text string (hereinafter also referred to as the Sender Code). The Sender Code is displayed on the Sender Code Dispensing World Wide Web Page 415, which is displayed in the sender's Browser 432. The sender copies the Sender Code into an electronic message and transmits the message to the recipient.

In an optional embodiment, a time delay replaces and/or satisfies the requirement for responding to a human response question. This makes the process more transparent when the Sender Code is automatically requested during the composition of an individual electronic message, since the electronic message may take comparable time to compose. The duration of the time delay is tunable by an administrator of the Sender Code Dispensing Computer 410. For example, one minute after the "To" address of an electronic message is filled in, a Sender Code is received. In another optional embodiment, the transmitting of a message is delayed until receipt of such a delayed Sender Code. This should not be a hardship as it only affects the first correspondence between two parties and imposes no additional delay during subsequent messaging. In another optional embodiment and for the benefit of disabled computer-users, the Independent Sender Code Dispensing Computer 410 generates an audio human response question permitting a verbal response.

An Incoming Message Handler 440 communicates via the Internet 140 and comprises a Sender Code Verification Calculator 441, an Account Table 442, an Approved Senders List 443, a Denied Senders List 444, an Automated Reply Sender 445 and a Failed Senders Table 446. Incoming Message Handler 440 receives an electronic message comprising a sender address and a recipient address. If the sender address is included in the Denied Senders List 444, Incoming Message Handler 440 discards the electronic message. Otherwise, if the sender address is included in the Approved Senders List 443, Incoming Message Handler 440 allows delivery of the electronic message to the recipient.

Otherwise, if the sender address is neither included in the Denied Senders List 444 nor included in the Approved Senders List 443, the Sender Code Verification Calculator 441 uses a Calculation Algorithm, not shown, to calculate a Sender Code using (1) the current date and time, (2) the Seed associated with the recipient address maintained in Account Table 442, (3) the sender address, and (4) the recipient address. The Calculation Algorithm used by the Sender Code Verification Calculator 441 is the same as the Calculation Algorithm used by the Sender Code Dispensing Calculator 414. The Sender Code Verification Calculator 441 calculates one or more additional Sender Codes based on one or more dates and time periods immediately prior to the current date and time, as well as one or more date and time periods immediately following the current date and time. The purpose of these additional Sender Codes is to provide a minimum period of time during which a Sender Code is verifiable, and to enable verification of an incoming Sender Code which was generated using a clock whose date and time were not necessarily synchronized with a clock (not shown) of the Incoming Message Handler 440.

If the electronic message comprises one or more of the Sender Codes generated by the Sender Code Verification Calculator 441, Incoming Message Handler 440 allows delivery of the electronic message to the recipient. Otherwise Incoming Message Handler 440 does not allow delivery of the electronic message to the recipient.

In an optional embodiment, if a delivery of the electronic message to the recipient is not allowed (as described above), the content of the message is analyzed in order to determine whether the message is UBE (possible by using any content analysis algorithm or system as should be obvious to one of ordinary skill in the art), and the sender address of the message is compared with a list of addresses in use by senders who are known to send UBE, and if the message is in fact determined to be UBE the message is deleted.

If a delivery of the electronic message to the recipient is not allowed (as described above) and not deleted (as described above), the Incoming Message Handler 440 determines whether the sender address is included in the Failed Senders Table 446. If the sender address is not included in the Failed Senders Table 446, the Incoming Message Handler 440 adds the sender address, coupled with the current date and time, to the Failed Sender Table 446 and causes the Automated Reply Sender 445 to send an electronic message to the sender address, the electronic message comprising (a) a notification that the sender's message was not delivered, (b) a Uniform Resource Locator (URL, also known as the web site address) of the Sender Code Dispensing World Wide Web Page 415 where a Sender Code may be obtained.

In an optional embodiment, the URL in (b) is for accessing a web page which will automatically open a new electronic message on the sender's computer with the "To", "From", "Subject", and "Body" fields filled in as they had been in the sender's original (returned) message, wherein this new message will also include a Sender Code. The sender can review and then send the message. Note that only two actions (or "clicks") are required to respond to the automated reply, in addition to answering a human response question (if required). In an optional embodiment, the URL in (b) is for accessing a web page which will automatically send an electronic message with the "To", "From", "Subject", and "Body" fields filled in as they had been in the sender's original (returned) message, wherein this new message will also include a Sender Code. Note that only one action (or "click") is required to respond to the automated reply, in addition to answering a human response question (if required). In another optional embodiment, Failed Senders Tables 446 are shared periodically with the Sender Code Dispensing Computer 410, for example during biweekly communications.

The Seed Distributor 412 communicates via the Internet 140 with Account Table 442 for confirming that Seed and recipient address couplings in Account Table 411 match Seed and recipient address couplings in Account Table 442. Optionally, Seed Distributor 412 periodically sends a new Seed to Account Table 411 and to Account Table 442, the new seed for associating with a particular recipient address.

Optionally, a World Wide Web page allows sending an electronic message, by providing a form in which to enter a sender address and a recipient address, facilitating insertion of a Sender Code by accessing a Sender Code Dispensing Computer 410, receiving a Sender Code, inserting the Sender Code into the message and sending the message. The message may comprise, attach or include a hyperlink to content associated with the World Wide Web page. The form may also allow composition of the body of the message. The Web page may display a human response question from the Sender Code Dispensing Computer 410 and return the response.

Figure 5:
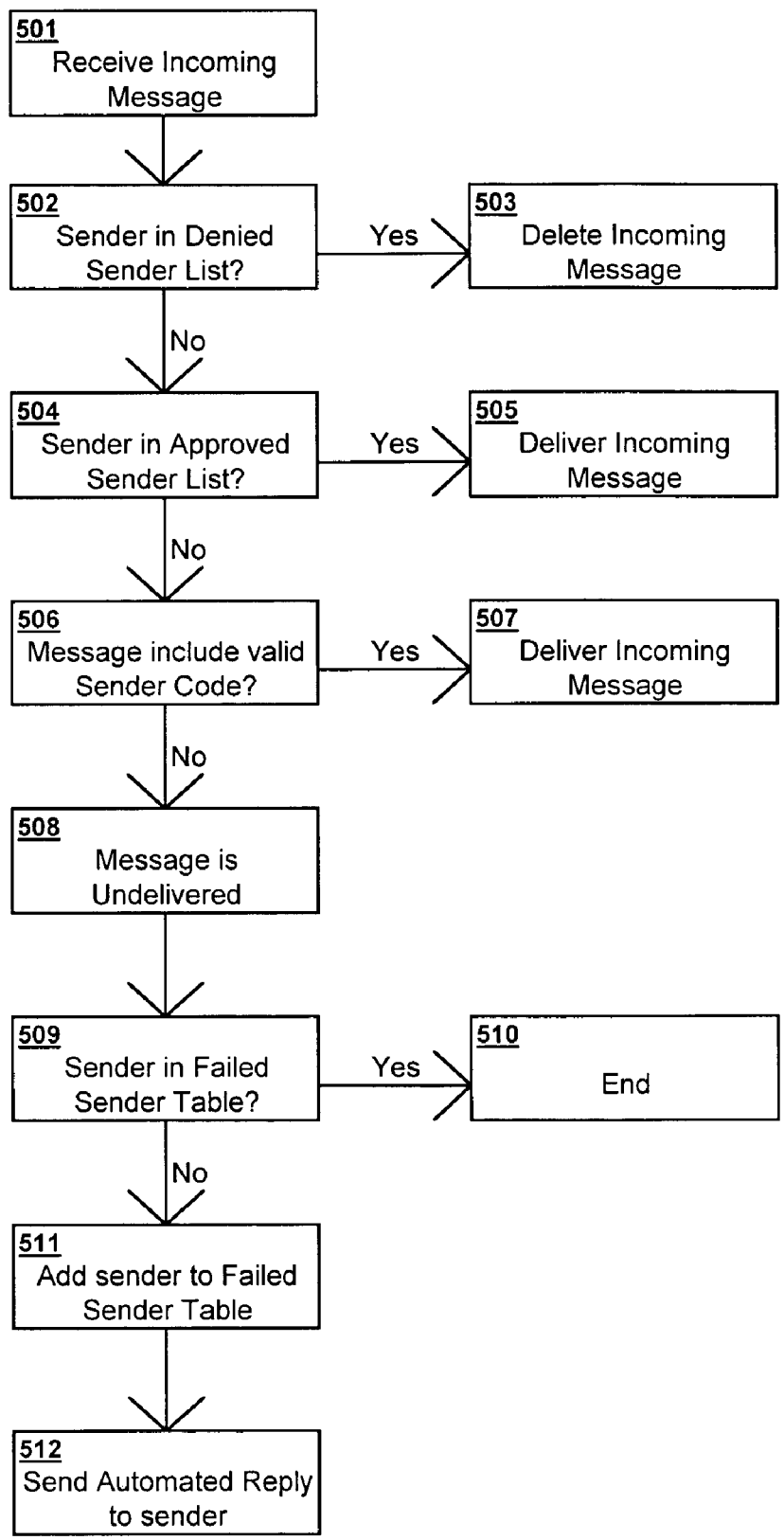
FIG. 5 is a flow diagram illustrating a method for verification of permissions for delivery of electronic messages, according to an embodiment of the present invention.

FIG. 5 is a flow diagram illustrating a method for verification of permissions for delivery of electronic messages, according to an embodiment of the present invention. Incoming Message Handler 440 receives 501 an incoming electronic message and determines 502 whether the sender address indicated in the electronic message is included in the Denied Senders List 444. If the sender address is included in the Denied Senders List 444, the Incoming Message Handler 440 discards 503 the incoming message. Otherwise, the Incoming Message Handler 440 determines 504 whether the sender address indicated in the electronic message is included in the Approved Senders List 443. If the sender address is included in the Approved Senders List 443, Incoming Message Handler 440 allows 505 delivery of the electronic message to the recipient. Otherwise, Incoming Message Handler 440 determines 506 whether the electronic message comprises one of the Sender Codes calculated for this message by the Sender Code Verification Calculator 441.

If the message comprises such a Sender Code, the Incoming Message Handler 440 allows 507 delivery of the electronic message to the recipient. If the message does not comprise such a Sender Code, the Incoming Message Handler 440 does not allow 508 delivery of the electronic message, and determines 509 whether the sender address indicated in the electronic message is included in the Failed Senders Table 446. If the sender address is included in the Failed Senders Table 446, no further action is taken 510. Otherwise, the Incoming Message Handler 440 adds 511 the sender address, coupled with the current date and time, to the Failed Senders Table 446, and the Automated Reply Sender 445 sends 512 an automated reply to the sender address.

Figure 6:
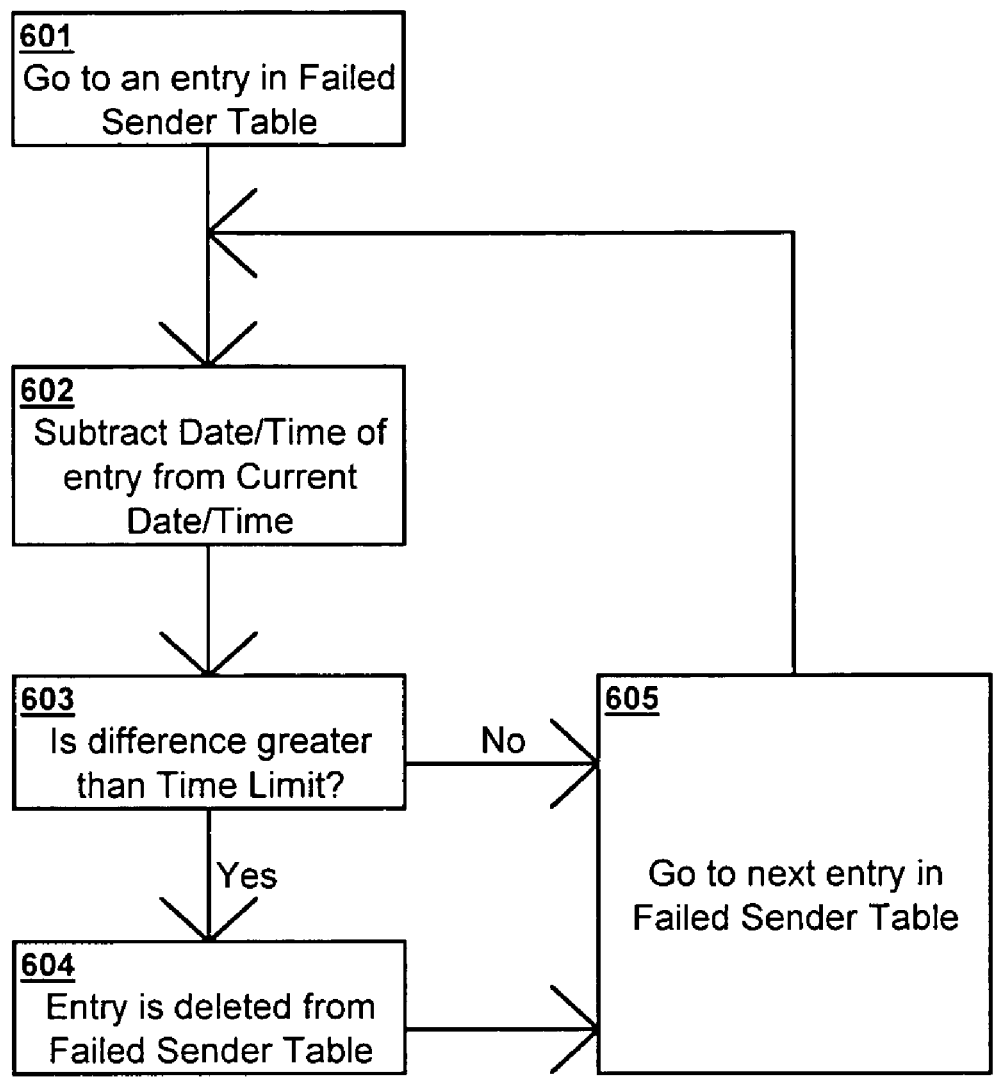
FIG. 6 is a flow diagram illustrating a method for processing failed sender records, according to an embodiment of the invention.

FIG. 6 is a flow diagram illustrating a method for processing failed sender records, according to an embodiment of the invention. The Incoming Message Handler 440 reads 601 a record of the Failed Sender Table 446, wherein the record comprises a sender address coupled with the date and time that the record was appended to the Failed Sender Table 446. The Incoming Message Handler 440 subtracts 602 the date and time indicated in the record from the current date and time, and determines 603 whether the difference is greater than a specific Time Limit (as set by a user and/or administrator of Incoming Message Handler 440). If the time difference is greater than the Time Limit, the record is deleted 604 from the Failed Sender Table 446, the Incoming Message Handler 440 reads 605 the next record of the Failed Sender Table 446, and step 602 repeats. If the time difference is not greater than the Time Limit, step 605 repeats, as described above. The effect of this periodic deletion of Failed Senders is to allow, after a time period has elapsed, the sending of an additional automated reply to a sender who has sent an additional electronic message that is undelivered due to a lack of permission.

Figure 7:
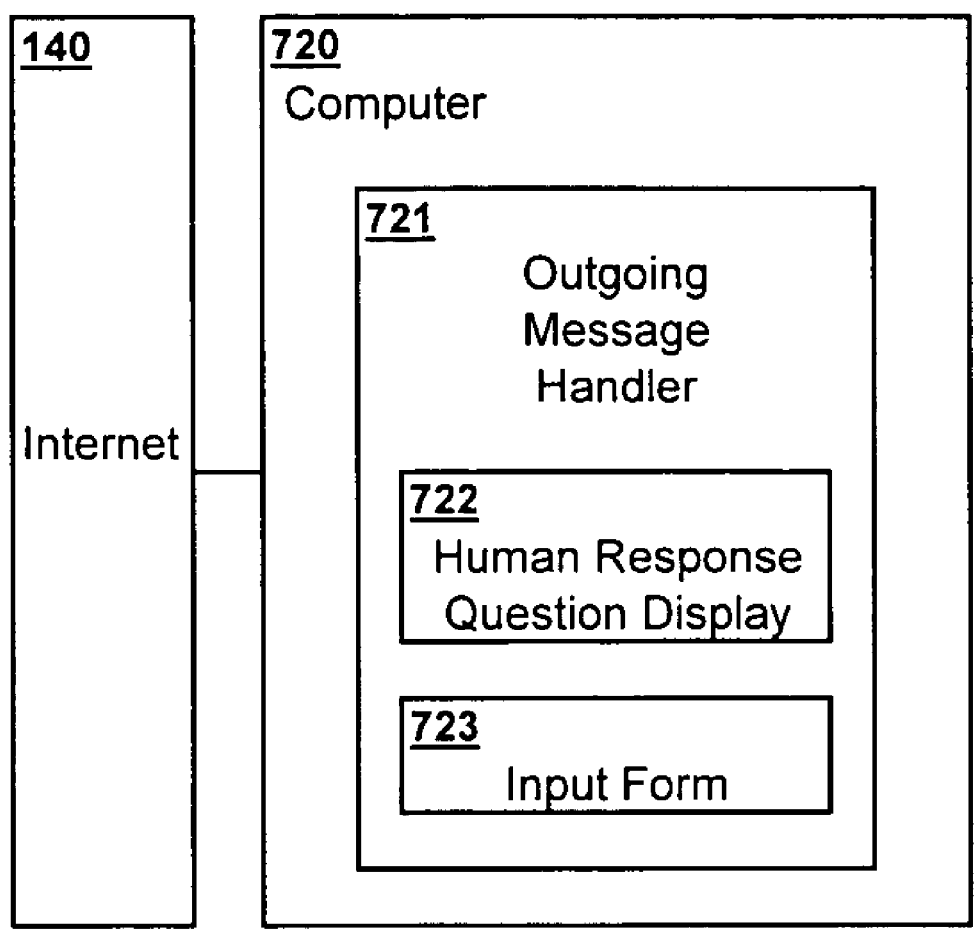
FIG. 7 is a block diagram illustrating a system for dispensing and verification of permissions for delivery of electronic messages using a human response question, according to an embodiment of the present invention.

FIG. 7 is a block diagram illustrating a system for dispensing and verification of permissions for delivery of electronic messages using a human response question, according to an embodiment of the present invention. A potential sender of an electronic message communicates via the Internet 140 using a Computer 720 comprising an Outgoing Message Handler 721, wherein Outgoing Message Handler 721 comprises a Human Response Question Display 722 and an Input Form 723. The Outgoing Message Handler 721 receives a human response question from an independent remote computer, and displays the human response question on the Human Response Question Display 722. The sender enters a response to the question into the Input Form 723, which is transmitted to the remote computer. If the response is correct, the Outgoing Message Handler 721 receives a text string from the remote computer, and the Outgoing Message Handler 721 inserts the text string into the outgoing message. The system described in FIG. 7 enables receipt of a Sender Code by a potential sender with less effort than if the potential sender receives a Sender Code at a Sender Code Dispensing World Wide Web Page (not shown in FIG. 7). In another optional embodiment, a cost is incurred by the sender for the dispensing of a Sender Code. In another optional embodiment, a time delay precedes the dispensing of a Sender Code, in order to limit the number of Sender Codes dispensed to a sender address and/or dispensed to an IP address.

An optional embodiment of the present invention addresses the potential problem of the delivery of messages with forged sender addresses that are on recipients' Approved Senders Lists, for example a sender address corresponding to a sender (such as a large or popular company) from whom a recipient receives legitimate periodic electronic messages. In this embodiment, a legitimate sender of bulk messages may elect to disallow its sender address from being included in Approved Senders Lists, and instead require its sender address to be included in Secure Senders Lists. The legitimate sender either a) includes with its electronic messages industry standard Digital IDs (also called Digital Signatures or Digital Certificates) which can be authenticated by the recipient's electronic message handler, b) participates in a system of sender authentication, or c) includes with its electronic messages Secure Sender Codes by accessing a Secure Sender Code Dispensing Computer via a secure Internet connection. The Secure Sender Code Dispensing Computer dispenses Secure Sender Codes without human response questions and without artificial time delays. Secure Sender Codes are dispensed and verified using either c) a Secure Calculation Algorithm that differs from the Calculation Algorithm used for publicly accessible Sender Codes or d) a Secure Seed that differs from the Seed used for publicly accessible Sender Codes. Messages from this sender address without an authenticated Digital ID, an authenticated sender address, or a verified Secure Sender Code are discarded by the recipient's electronic message handler.

Note that the preceding optional embodiment assumes the active participation of such senders and presents a solution to the growing problem of email-phishing. Phishing attacks involve the mass distribution of 'spoofed' electronic messages with return addresses, links, and/or branding which appear to come from legitimate sources such as banks, insurance agencies, retailers or credit card companies. These fraudulent messages are designed to fool the recipients into divulging personal authentication data such as account usernames and passwords, credit card numbers, social security numbers, etc. Such messages may comprise links to web pages that are replicas of actual login pages of legitimate sources, fooling users into believing that they are submitting their sensitive information to a legitimate web site. Such web pages may have deceptive URLs, such as citibank.f76 hrdv-.com.

The following describes, by way of illustration and not limitation, an example specification of a protocol for communicating with a Sender Code Dispensing Computer within existing electronic messaging protocols. This example does not require a central database other than a DNS (Domain Name System) registry, and allows a software program to locate a relevant Sender Code Dispensing Computer, request and receive a Sender Code. Other implementations will be obvious to one of ordinary skill in the art.

Names of Sender Code Dispensing Computers

ISPs and organizations who maintain their own Sender Code Dispensing Computers can set the name of the server as sendercode.[domain]. For example, a company whose email addresses are of the form johndoe@widgets.com can dispense Sender Codes at sendercode.widgets.com.

Other users can rely on Sender Code Dispensing Computers hosted by a Sender Code dispensing authority, such as sendercode.com, to dispense Sender Codes for their domains. Such Sender Code Dispensing Computers can be identified by addresses of the form [nnn].sendercode.com where n is a digit. Sender Code Dispensing Computers at those addresses are identical in function, and the number of such Computers can increase with demand. Requests to the name sendercode.com will be distributed to the Computer(s) described above.

Communication with Sender Code Dispensing Computers

Sender to Sender Code Dispensing Computer: The following parameters are included with an automated request to a Sender Code Dispensing Computer:
    from=[local-part@domain]
    to=[local-part@domain]
    response=[response_to_human_response_question]

The value of "from" comprises the recipient's address, e.g. johndoe@widgets.com. The value of "to" comprises the sender's address. The value of "response" comprises the answer to a human response question, if in use, as entered into a form.

Sender Code Dispensing Computer to Sender: The response from the Sender Code Dispensing Computer may be the dispensing or denial of a Sender Code, or the request for a response to a human response question. Values are returned to the sender in two formats within the same page. The first format is a machine-readable set of tags within the head of an HTML (Hyper-Text Markup Language) document, as shown below. The second format is HTML code to be displayed by a browser.
    <meta sendercode=[sendercode]>
    <meta from=[local-part@domain]>
    <meta to=[local-part@domain]>
    <meta img=[url_of_human_response_image]>
    <meta question=[text_of_human_response_question]>

If a human response question is required to be answered, the "from" and "to" parameters are returned so they may be included in the next request. The value of "img" is the URL of an image for use with, or as, a human response question. The value of "question" is text that accompanies the image, or text that stands alone as a human response question. Notification that a human response question has been answered incorrectly is included in the "question" tag.

Placement of Sender Codes

Sender code verification software searches for a valid Sender Code in the "Subject" field of the message header. Senders are instructed to place Sender Codes in the "Subject" field, and software that automates the insertion of Sender Codes in messages places Sender Codes in the "Subject" field.

Conventions

The following conventions are recommendations and are not necessary to achieve functionality.

Format and Placement of Sender Codes

A Sender Code comprises text with a minimum length of five characters. The length of the Sender Code may be increased to achieve lower probabilities of correctly guessing a code.

Sender Codes inserted by software are enclosed in square brackets, preceded by three spaces and appended to the "Subject" field. In the first example that follows, the Sender Code was inserted into an empty subject field.
    Subject: [000000]
    Subject: This text was written by the sender [000000]

Sender Codes are dispensed with or without spaces or punctuation, as in 000000, 000 000, 000.0000 or 000-000-000.

Sender code verification software should return a positive result if the digits of a valid Sender Code are contained in the "Subject" field in the correct order regardless of inclusion of or interruption by spaces or punctuation, and regardless of where the digits fall within the "Subject" field.

Multiple Sender Codes (corresponding to multiple message recipients) that are inserted by software should be inserted serially following the above convention, or inserted as a group separated by punctuation, as follows:
    Subject: This text was written by the sender [000001] [000002] [000003]
    Subject: This text was written by the sender [000001, 000002, 000003]

Restrictions on Dispensing of Sender Codes

The following recommended restriction applies to multiple requests for Sender Codes. This restriction is applied by each Sender Code Dispensing Computer individually without consultation with other Sender Code Dispensing Computers. Sharing of information between Sender Code Dispensing Computers would further restrict the dispensing of Sender Codes.
    If a Sender Code Dispensing Computer receives a request for a Sender Code that is based on the same sender address, or originates from the same IP address, as a Sender Code dispensed by the Sender Code Dispensing Computer in the preceding 15 minutes, a correct response to a human response question is required prior to dispensing the Sender Code. Otherwise a Sender Code is dispensed without delay.

In addition, a limit is placed on the quantity of Sender Codes that a Sender Code Dispensing Computer dispenses to a given sender, based on the sender address or originating IP address, even if the Sender Code request is accompanied by a correct response to a human response question. This limitation is imposed because a large number of messages sent to recipient addresses with which the sender has not previously corresponded would be considered unsolicited bulk email, even though the sender attends to each message individually. A combination of limits can be used, such as 50 Sender Codes per hour and 200 Sender Codes per day.

In addition, a limit may be placed on the number of incorrect answers to a human response question within a period of time, for example five incorrect answers in 15 minutes. When such limit is reached, the sender address and the IP address from which the request is made is prohibited from receiving a Sender Code until a period of time has elapsed, for example 15 minutes.

Efficiency in Dispensing Sender Codes

A dispensed Sender Code is accompanied by the parameters of a new human response question for use with the next Sender Code request (if there is one) originating from the same IP address. Therefore, the next request can include all required information: sender address, recipient address and the response to a human response question. This allows a Sender Code to be dispensed in one step, rather than requiring a human response question to be responded to in a second step.

Example Calculation Algorithm

Following is an example Calculation Algorithm for generating a Sender Code. In this example, the Sender Code is based only on the recipient address, the recipient address is an email address, and the Sender Code has six digits.

A recipient address is in the form local-part@domain. Convert the characters of the address to ASCII decimal numbers. Change lower case letters to upper case prior to ASCII conversion, thereby rendering the Sender Code generation case-insensitive. Determine the reciprocals of the ASCII decimal numbers, compute the sum of the reciprocals, and multiply the sum by 100. The first six digits following the decimal point of this product represents the Sender Code.

In the following illustration, this Calculation Algorithm is applied to an alpha-numeric seed, 123456789, generated for the recipient address JDoe123@widgets.com. Corresponding ASCII decimal numbers are listed below each character of the seed:

| 1 | 2 | 3 | 4 | 5 | 6 | 7 | 8 | 9 |
|---|---|---|---|---|---|---|---|---|
| 49 | 50 | 51 | 52 | 53 | 54 | 55 | 56 | 57 |

The reciprocals of these ASCII decimal numbers are 0.0204081633, 0.02, 0.0196078431, 0.0192307692, 0.0188679245, 0.0185185185, 0.0181818182, 0.0178571429, 0.0175438596.

The sum of these reciprocals is 0.1702160394. The product of this sum and 100 is 17.02160394. The resulting Sender Code, which comprises the first six digits following the decimal point, is 021603.

Optionally, when the Sender Code is further based on a recipient address, the reciprocals of the characters of the recipient address are included in the sum. In this illustration, the recipient address is JDoe123@widgets.com. The corresponding ASCII decimal number is listed below each character of the sender address:

| J | D | O | E | 1 | 2 | 3 | @ | W | I | D | G | E | T | S | . | C | O | M |
|---|---|---|---|---|---|---|---|---|---|---|---|---|---|---|---|---|---|---|
| 74 | 68 | 79 | 69 | 49 | 50 | 51 | 64 | 87 | 73 | 68 | 71 | 69 | 84 | 83 | 46 | 67 | 79 | 77 |

The reciprocals of these ASCII decimal numbers are 0.013513514, 0.014705882, 0.012658228, 0.014492754, 0.020408163, 0.02, 0.019607843, 0.015625, 0.011494253, 0.01369863, 0.014705882, 0.014084507, 0.014492754, 0.011904762, 0.012048193, 0.02173913, 0.014925373, 0.012658228, 0.012987013.

The sum of these reciprocals is 0.2857501088. The product of this sum and 100 is 28.57501088. Added to the product 17.02160394 of the previous example, the new sum is 45.59661482. The resulting Sender Code, which comprises the first six digits following the decimal point, is 596614.

Optionally, when the Sender Code is further based on a current date or a current time, the reciprocals of the characters of the 4-digit year, 2-digit month number, 2-digit day of the month and 2-digit hour are included in the sum.

In the following illustration, the current date is 13 Dec. 2011 and it is 15 minutes past 2:00 PM, which may be written as 14:15. The corresponding ASCII decimal number is listed below each character of the time:

| Year | | | | Month | | Day | | Hour | |
|---|---|---|---|---|---|---|---|---|---|
| 2 | 0 | 1 | 1 | 1 | 2 | 1 | 3 | 1 | 4 |
| 50 | 48 | 49 | 49 | 49 | 50 | 49 | 51 | 49 | 52 |

The reciprocals of these ASCII decimal numbers are 0.02, 0.0208333333, 0.0204081633, 0.0204081633, 0.0204081633, 0.02, 0.0204081633, 0.0196078431, 0.0204081633, 0.0192307692.

The sum of these reciprocals is 0.2017127620. The product of this sum and 100 is 20.17127620. Added to the product 45.59661482 of the previous example, the new sum is 65.76789102. The resulting Sender Code, which comprises the first six digits following the decimal point, is 767891.

When the Sender Code is further based on a sender address, the reciprocals of the characters of the sender address are included in the sum.

In the following illustration, the sender address is ab@cdjp. The corresponding ASCII decimal number is listed below each character of the sender address:

| a | b | @ | c | d | . | j | p |
|---|---|---|---|---|---|---|---|
| 65 | 66 | 64 | 67 | 68 | 46 | 74 | 80 |

The reciprocals of these ASCII decimal numbers are 0.0153846154, 0.0151515152, 0.0156250000, 0.0149253731, 0.0147058824, 0.0217391304, 0.0135135135, 0.0125.

The sum of these reciprocals is 0.1235450300. The product of this sum and 100 is 12.35450300. Added to the sum 65.76789102 of the previous example, the new sum is 78.12239402. The resulting Sender Code, which comprises the first six digits following the decimal point, is 122394.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for dispensing permissions for delivery of electronic messages, comprising the steps of:
   receiving, by a sender-code dispensing computer, a recipient-address from a sender;
   generating, by the sender-code dispensing computer, a sender-code based on an alpha-numeric seed (seed), the seed previously generated for the recipient-address by a seed-generating computer, the sender-code for inserting into an electronic message for delivery from the sender to the recipient-address; and
   transmitting, by the sender-code dispensing computer, the sender-code to the sender;
   whereby an incoming message-handler, that is distinct from the sender-code dispensing computer and the seed-generating computer, (a) receives the electronic message sent to the recipient-address, (b) generates a verification sender-code based on the seed previously generated for the recipient-address by the seed-generating computer, (c) verifies the sender-code inserted in the electronic message by comparing the sender-code with the verification sender-code generated by the incoming mail-handler, and (d) sorts the electronic message based on the outcome of the verification, thereby stopping delivery of unsolicited bulk electronic messages.

2. The method of claim 1, further comprising the step of transmitting, by the sender-code generating computer, a World Wide Web document to the sender, the World Wide Web document comprising a first input field for receiving the recipient-address from the sender.

3. The method of claim 2, wherein the sender-code is further based on a sender-address as indicated by the sender using a second input field in the World Wide Web document.

4. The method of claim 1, wherein the sender-code is further based on a current date or a current time.

5. The method of claim 1, wherein the seed-dispensing computer periodically generates a new seed for the recipient-address.

6. The method of claim 1, wherein the sending step is preceded by a time delay.

7. The method of claim 1, wherein the sending step comprises incurring a cost to the sender.

8. A method for dispensing permissions for delivery of electronic messages, comprising the steps of:
   receiving, by a sender-code dispensing computer, a recipient-address from a sender;
   requesting, by the sender-code dispensing computer, a response from the sender to a human-response question;
   generating, by the sender-code dispensing computer, a sender-code when the response to the human-response question is correct, the sender-code based on an alpha-numeric seed (seed), the seed previously generated for the recipient-address by a seed-generating computer, the sender-code for inserting into an electronic message for delivery from the sender to the recipient-address; and
   transmitting, by the sender-code dispensing computer, the sender-code to the sender;
   whereby an incoming message-handler, that is distinct from the sender-code dispensing computer and the seed-generating computer, (a) receives the electronic message sent to the recipient-address, (b) generates a verification sender-code based on the seed previously generated for the recipient-address by the seed-generating computer, (c) verifies the sender-code inserted in the electronic message by comparing the sender-code with the verification sender-code generated by the incoming mail-handler, and (d) sorts the electronic message based on the outcome of the verification, thereby stopping delivery of unsolicited bulk electronic messages.

9. The method of claim 8, further comprising the step of transmitting, by the sender-code generating computer, a World Wide Web document to the sender, the World Wide Web document comprising (a) the human-response-question for displaying to the sender, (b) a first input field for receiving the response to the human-response-question from the sender, and (c) a second input field for receiving the recipient-address from the sender.

10. The method of claim 8, wherein the sender-code is further based on a current date or a current time.

11. The method of claim 8, wherein the sender-code is further based on a sender-address as indicated by the sender using a third input field in the World Wide Web document.

12. The method of claim 8, wherein the seed-dispensing computer periodically generates a new seed for the recipient-address.

13. A method for verifying permissions for delivery of electronic messages, comprising the steps of:
   receiving, by an incoming message-handler for a recipient-address, an electronic message from a sender for delivery to the recipient-address, the electronic message comprising a sender-address and a sender-code, the sender-code previously generated by a sender-code dispensing computer, that is distinct from the incoming message-handler, the sender-code based on an alpha-numeric seed (seed), the seed generated for the recipient-address by a seed-generating computer, that is distinct from the incoming message-handler;
   generating, by the incoming message-handler, a verification sender-code based on a seed previously generated for the recipient-address by the seed-generating computer;
   accepting, by the incoming message-handler, the electronic message for delivery to the recipient-address when the sender-code comprised within the electronic message matches the verification sender-code; and
   rejecting, by the incoming message-handler, the electronic message for delivery to the recipient-address when the sender-code comprised within the electronic message does not match the verification sender-code.

14. The method of claim 13, wherein the verification sender-code is further based on a current date or a current time.

15. The method of claim 13, wherein the verification sender-code is further based on the sender-address.

16. The method of claim 13, wherein the seed-dispensing computer periodically generates a new seed for the recipient-address.

17. The method of claim 13, wherein the rejecting step further comprises (a) storing the sender-address, coupled with a current date and time, into a failed-sender table and (b) sending a reply message to the sender-address, wherein the reply message comprises (c) a notification of non-delivery of the electronic message and (d) a URL indicating the sender-code dispensing computer.

18. The method of claim 17, further comprising the step of periodically purging the failed-sender table of sender-addresses that have remained in the failed-sender table for greater than a time limit, the time limit as indicated by a user or administrator.

19. A method for verifying permissions for delivery of electronic messages, comprising the steps of:
  receiving, by an incoming message-handler for a recipient-address, an electronic message from a sender for delivery to the recipient-address, the electronic message comprising a sender-address and a sender-code, the sender-code previously generated by a sender-code dispensing computer, that is distinct from the incoming message-handler, the sender-code based on an alpha-numeric seed (seed), the seed generated for the recipient-address by a seed-generating computer, that is distinct from the incoming message-handler;
  generating, by the incoming message-handler, a verification sender-code based on a seed previously generated for the recipient-address by the seed-generating computer;
  accepting, by the incoming message-handler, the electronic message for delivery to the recipient-address when the sender-code comprised within the electronic message matches the verification sender-code; and
  rejecting, by the incoming message-handler, the electronic message for delivery to the recipient-address when the sender-code comprised within the electronic message does not match the verification sender-code;
  wherein the rejecting step further comprises (a) storing the sender-address, coupled with a current date and time, into a failed-sender table and (b) sending a second message (reply message) to the sender-address, wherein the reply message comprises (c) a notification of non-delivery of the original message and (d) a URL indicating the sender-code dispensing computer, the URL for accessing a World Wide Web document for sending a third electronic message (retry message), the retry message having its "To", "From", "Subject" and "Body" fields filled in according to the original message, the retry message comprising a third sender-code (retry sender-code) as generated by the sender-code dispensing computer, and the World Wide Web document for causing the third message to be sent in response to only a single action being performed.

20. A method for processing an electronic message, the electronic message for delivery from a sender to a recipient-address, comprising the steps of:
  transmitting, by an outgoing message-handler for the sender, the recipient-address to a sender-code dispensing computer;
  receiving, by the outgoing message-handler, a sender-code from the sender-code dispensing computer, the sender-code based on an alpha-numeric seed (seed), the seed previously generated for the recipient-address by a seed-generating computer, the sender-code for inserting into the electronic message for delivery from the sender to the recipient-address; and
  inserting, by the outgoing message-handler, the sender-code into the electronic message;
  whereby an incoming message-handler, that is distinct from the sender-code dispensing computer and the seed-generating computer, (a) receives the electronic message sent to the recipient-address, (b) generates a verification sender-code based on a seed previously generated for the recipient-address by the seed-generating computer, (c) verifies the sender-code in the electronic message by comparing the sender-code with the verification sender-code generated by the incoming mail-handler, and (d) sorts the electronic message based on the outcome of the verification, thereby stopping delivery of unsolicited bulk electronic messages.

21. The method of claim 20, wherein the receiving step is preceded by a time delay.

22. The method of claim 20, wherein the receiving step comprises incurring a cost to the sender.

23. The method of claim 20, further comprising the steps of:
  displaying a human-response-question to the sender;
  receiving a response to the human-response-question from the sender;
  determining a correctness of the response.

24. The method of claim 23, wherein the human-response-question is generated by the sender-code dispensing computer, and wherein the determining step comprises (a) submitting the response to the sender-code dispensing computer and (b) receiving a confirmation of the correctness of the response.

25. A system for dispensing permissions for delivery of electronic messages, comprising:
  a communications channel for receipt by a sender-code generating processor of a recipient-address from a sender; and
  a sender-code generating processor coupled to the communications channel, the sender-code generating processor for (a) generating a sender-code based on an alpha-numeric seed (seed), the seed previously generated for the recipient-address by a seed-generating computer, and (b) transmitting the sender-code to the sender for inserting into an electronic message for delivery from the sender to the recipient-address;
  whereby an incoming message-handling processor coupled to the communications channel is configured to, the incoming message-handling processor being distinct from the sender-code dispensing processor and the seed-generating computer, (a) receive the electronic message sent to the recipient-address (b) generate a verification sender-code based on the seed previously generated for the recipient-address by the seed-generating computer, (c) verify the sender-code inserted in the electronic message by comparing the sender-code with the verification sender-code generated by the incoming mail-handling processor; and (d) sort the electronic message based on the outcome of the verification, thereby stopping delivery of unsolicited bulk electronic messages.

26. The system of claim 25, wherein the sender-code generating processor further for transmitting a World Wide Web document to the sender via the communications channel, the World Wide Web document comprising a first input field for receiving the recipient-address from the sender.

27. The system of claim 25, wherein the sender-code is further based on a current date or a current time.

28. The system of claim 26, wherein the sender-code is further based on a sender-address as indicated by the sender using a second input field in the World Wide Web document.

29. The system of claim 25, wherein the seed-dispensing computer periodically generates a new seed for the recipient-address.

30. A system for verifying permissions for delivery of electronic messages, comprising:
  a communications channel for receiving an electronic message from a sender for delivery to a recipient-address, the electronic message comprising a sender-address and a sender-code, the sender-code previously generated by a sender-code dispensing processor, the sender-code based on an alpha-numeric seed (seed), the seed generated for the recipient-address by a seed-generating computer; and an incoming message-handling processor coupled to the communications channel, the incoming message-handling processor being distinct from the sender-code dispensing processor and the seed-generating computer, the incoming message-handling processor for (a) receiving the electronic message from the sender, (b) generating a verification sender-code based on a seed previously generated for the recipient-address by the seed-generating computer, (c) accepting the electronic message for delivery to the recipient-address when the sender-code comprised within the electronic message matches the verification sender-code; and (d) rejecting the electronic message for delivery to the recipient-address when the sender-code comprised within the electronic message does not match the verification sender-code.

31. The system of claim 30, wherein the verification sender-code is further based on a current date or a current time.

32. The system of claim 30, wherein the verification sender-code is further based on the sender-address.

33. The system of claim 30, wherein the seed-dispensing computer periodically generates a new seed for the recipient-address.

34. The system of claim 30, wherein the sender-code generating processor further for (a) storing the sender-address, coupled with a current date and time, into a failed-sender table and (b) sending a reply message to the sender-address, wherein the reply message comprises (c) a notification of non-delivery of the electronic message and (d) a URL indicating the sender-code dispensing computer.

35. The system of claim 34, wherein the sender-code generating processor further for periodically purging the failed-sender table of sender-addresses that have remained in the failed-sender table for greater than a time limit, the time limit as indicated by a user or administrator.

* * * * *